W. B. KNAPP.
ANIMAL TRAP.
APPLICATION FILED AUG. 24, 1909.
1,016,333.
Patented Feb. 6, 1912.
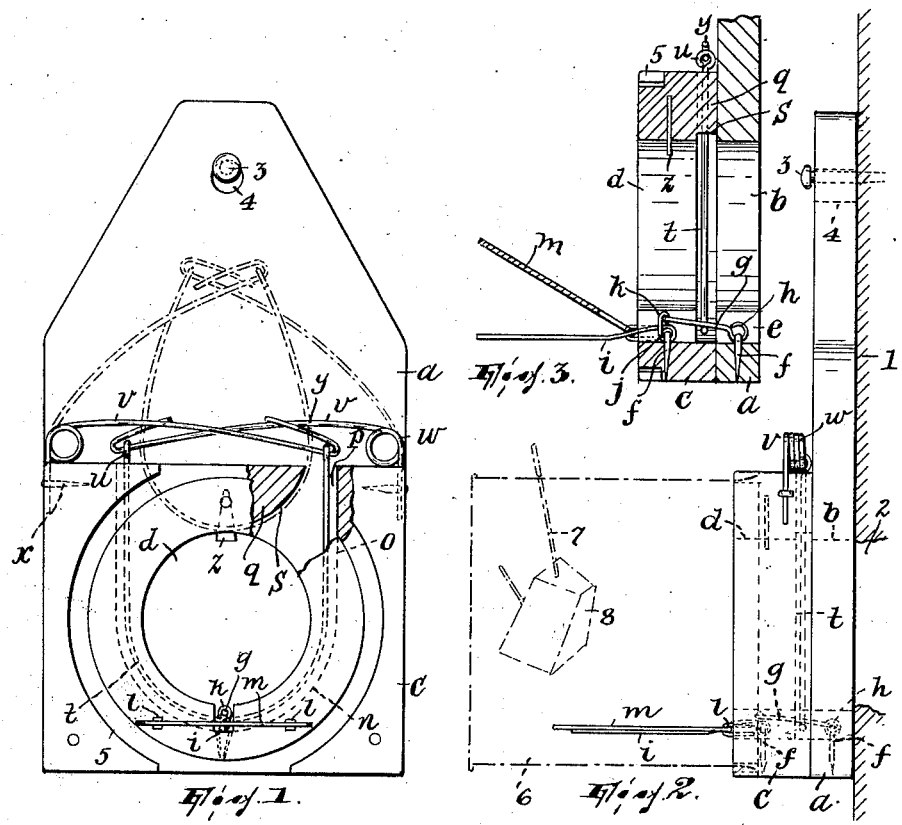
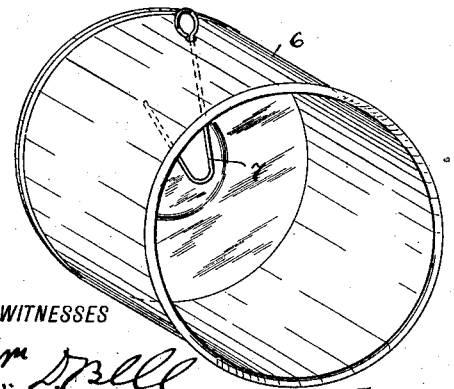
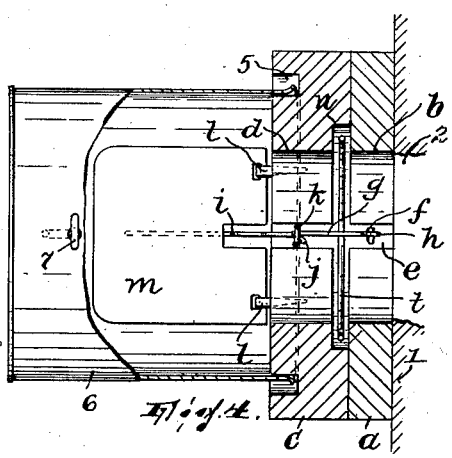
WITNESSES
INVENTOR,
William B Knapp,
BY
ATTORNEY

UNITED STATES PATENT OFFICE.

WILLIAM B. KNAPP, OF PATERSON, NEW JERSEY.

ANIMAL-TRAP.

1,016,333.  Specification of Letters Patent.  Patented Feb. 6, 1912.

Application filed August 24, 1909. Serial No. 514,359.

*To all whom it may concern:*

Be it known that I, WILLIAM B. KNAPP, a citizen of the United States, residing in Paterson, Passaic county, New Jersey, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to animal traps, and particularly to traps for catching rats, mice and similar rodents, my principal objects being to provide an inexpensive and efficient trap which may be used either without or with bait.

Referring to the accompanying drawing, in which my invention is fully illustrated, Figure 1 is a front elevation of the trap as used without bait; Fig. 2 is a side elevation of the trap showing it attached to a wall or the like over a hole formed therein and frequented by the rodent, the full-lines showing the trap when used without bait and the dot-and-dash outline indicating the part employed to convert the trap into one used with bait; Fig. 3 is a vertical sectional view of a fragment of what is shown in full lines in Fig. 2, the trap being shown as set and a certain platform raised out of supported relation to the trigger; Fig. 4 is a horizontal sectional view of what is shown in Fig. 2, the part which converts the trap into a bait-trap being attached and shown partly broken away; and, Fig. 5 is a perspective view of said part.

*a* is a block or plate (preferably of wood) having an orifice *b* at its lower end formed of such size as to accommodate the kind of animal to be caught; secured to the front face of the lower part of this block is another block *c* (also preferably of wood) having an orifice *d* registering with and of the same size and form as the orifice *b*. The passage produced by these orifices has a slot *e* formed at the bottom thereof, and in this are arranged in line with each other two staples *f* or other suitable pivoting devices. On the rear one of these two devices is pivoted a wire detent *g*, the same being a straight piece of wire having one end formed as an eye *h* penetrated by the staple; on the forward device *f* is a trigger *i* which is also substantially straight except where, at one end, it is bent into an eye *j* penetrated by the staple, the extremity of said end being shaped into a hook *k*, which is adapted to engage the end of the detent *g* when the latter occupies the position shown in full lines in the drawing. The several parts *f*, *g* and *i* in the position referred to lie within the slot *e* below the surface of the passage in the blocks (except the major portion of the part *i*, which projects horizontally forward of the block *c*) and the slot being rather narrow they are not likely to be moved by the animal prematurely. Two staples *l* or other pivoting devices are secured in a horizontal line to the front face of the block *c* just below the passage, and on these is pivoted the platform *m*, which, when the trap is set, rests on the forwardly projecting portion of the trigger *i*.

The back of the block *c* around its orifice *d* is cut away to produce a rabbet *n* surrounding said orifice, said rabbet being a part of a recess *o* which terminates upwardly in two openings *p*, leaving an intermediate part *q* of the material between them. Said part forms a stop, and it has a rounded under face *s*. A U-shaped yoke *t* is movable vertically in the recess *o*, it being preferably of spring-wire and having its ends, whose extremities are formed as eyes *u*, passed upwardly through the openings *p*. In its depressed position, the lower part of the yoke may lie substantially concealed in the rabbet, and when raised the stop *q* limits its upward motion, the curved part of the yoke conforming to the curved face *s* of the stop.

*v* designate spring-members which carry the yoke. Each consists of a piece of spring wire having a coil *w* which bears against the top of the block *c* and having one end secured to one side of the block by a staple or the like *x* and its other end formed as an elongated hook *y*. The spring-members are crossed and their hooks *y* are engaged in the eyes *u* of the yoke. The yoke being elastic, its ends allow the hooked ends of the spring-members to approach each other as they rise and raise the yoke, while the yoke will expand to its normal condition when the spring-members are depressed.

In the top of the passage is preferably inserted a spur $z$.

As so far described the trap is designed to be used without bait. It is placed against a wall or the like 1 having a hole 2 therein frequented by the rodent with its passage registering with said hole, being preferably secured in place by a headed screw or pin 3 received by the hole 4 in the block $a$. Previously, the trap has been set by depressing the yoke, arranging the detent $g$ in holding relation to the lower part of the yoke, crossing the same, and engaging the hook $k$ of the trigger with the free end of the detent. When an animal attempts to leave the hole it must bear its weight upon the platform, the effect of which is to move the trigger, release the detent and allow the yoke to rise and grip the animal, forcing its back against the spur $z$.

It will be observed that, owing to the fact that the gripping mechanism, comprising the yoke $t$ and the spring members $v$ is disposed and movable in a plane extending across the animal passage substantially at right angles thereto, the thickness of the body-portion or supporting member (comprising parts $a$ and $c$) of the trap may be relatively limited, measured in the direction of the length of said passage. The purpose of this is to allay the suspicions of the animal, it being obvious that the shorter the passage appears the more likely will the animal be to attempt to pass through it.

In order to adapt the trap to be used with bait, a circular groove 5 is formed in the front face of the block $c$, and into this groove is inserted the mouth of a cylindrical box 6 having one end closed and provided with a depending hook 7 for the bait 8; the hook is disposed just far enough from the mouth of the box so that the animal must bear down upon the platform, which is inclosed within the box, before it can reach the bait. The relative disposition of the box and the body of the trap is such that the trap can be placed out in a clear space as well as secured over the hole frequented by the rodents, the mouth of the box being slightly flaring so that it may be fitted snugly in the groove.

Having thus fully described my invention, what I claim and desire to secure by Letters Patent is:

1. In an animal trap, the combination of a supporting member having a passage therethrough, a spring-actuated part movable across said passage and normally standing at one side of the same, said passage having a slot at its other side, and a trip mechanism adapted to hold the said part at said other side of the passage and having the part thereof engageable with said spring-actuated part concealed in the slot and another part thereof projecting in position to be engaged by the animal in said passage, substantially as described.

2. The combination of a support comprising two substantially flat blocks secured face to face, one of said blocks extending higher than the other, said blocks having alined orifices forming a passage in said member, upwardly acting crossing springs secured to and extending over the second-named block, said second-named block having in the face thereof adjoining the higher block a recess surrounding the orifice in said second-named block, a U-shaped member arranged with its lower portion in said recess and having its extremities extending upwardly through the second-named block and respectively attached to the ends of said springs, and a trip mechanism arranged in said member at the lower side of said passage and normally restraining said member against the upward pull of said springs, substantially as described.

3. The combination of a supporting member having a passage therethrough and a continuous groove surrounding said passage, a cylindrical bait-holding member having one end closed and the other end open and received by said groove, a spring-actuated part movable across said passage and normally standing at one side of the same, and a trip mechanism engageable with said part to hold the same at the other side of said passage, substantially as described.

In testimony, that I claim the foregoing, I have hereunto set my hand this 23rd day of August, 1909.

WM. B. KNAPP.

Witnesses:
JOHN W. STEWARD,
WM. D. BELL.

---

Copies of this patent may be obtained for five cents each, by addressing the "Commissioner of Patents, Washington, D. C."